US005859706A

United States Patent [19]

Nagashima et al.

[11] Patent Number: 5,859,706

[45] Date of Patent: Jan. 12, 1999

[54] PHOTOELECTRIC SMOKE DETECTOR AND DISASTER MONITORING SYSTEM USING THE PHOTOELECTRIC SMOKE DETECTOR

[75] Inventors: Tetsuya Nagashima, Kawachinagano; Naoki Kosugi; Yoshiki Ohmori, both of Sagamihara, all of Japan

[73] Assignee: Hochiki Kabushiki Kaisha, Tokyo, Japan

[21] Appl. No.: 683,960

[22] Filed: Jul. 19, 1996

[30] Foreign Application Priority Data

Jul. 20, 1995 [JP] Japan .................................... 7-183801

[51] Int. Cl.[6] ........................... G01B 11/00; G01N 21/00; G01N 15/06

[52] U.S. Cl. ........................... 356/394; 356/438; 250/574

[58] Field of Search ..................................... 356/394, 237, 356/336 R, 337, 338, 369, 438 R; 250/573, 574, 577; 340/514, 516, 540, 556, 629, 515, 628, 630

[56] References Cited

U.S. PATENT DOCUMENTS 4,317,113 2/1982 Honma .................................... 340/630
5,497,009 3/1996 Torikoshi et al. ....................... 250/574
5,532,472 7/1996 Furuta ..................................... 250/214
5,552,765 9/1996 Vane et al. .............................. 340/515
5,576,697 11/1996 Nagashima et al. .................... 340/630

FOREIGN PATENT DOCUMENTS 83 112 561 12/1983 European Pat. Off. .
84 102 987 3/1984 European Pat. Off. .
94 119 360 8/1994 European Pat. Off. .

*Primary Examiner*—Frank G. Font
*Assistant Examiner*—Michael P. Stafira
*Attorney, Agent, or Firm*—Lackenbach Siegel Marzullo Aronson & Greenspan, P.C.

[57] ABSTRACT

A drive pulse for emitting and turning-off a light emitting element is output, the level difference or the level ratio between the light emission zero point detection signal from a light receiving element having received the light from the light emitting element and a putting-off zero point detection signal from the light receiving element when the light emitting element is put off is calculated, and the level difference or the level ratio is compared with a preset level to thereby determine the abnormality of the light emitting element, the light receiving element and a peripheral circuit. With this arrangement, even if the ratio of noise light occupied in the zero point output is reduced, whether detecting elements and the peripheral circuit are good or bad and whether the elements are abnormally polluted or not can be reliably tested without the effect of the dispersion of the detecting elements and the change of an ambient temperature, whereby the reliability of a smoke detector is improved.

10 Claims, 9 Drawing Sheets

PHOTOELECTRIC SMOKE DETECTOR AND DISASTER MONITORING SYSTEM USING THE PHOTOELECTRIC SMOKE DETECTOR

BACKGROUND OF THE INVENTION

1. Field of the Invention

The present invention relates to a photoelectric smoke detector used to a disaster monitoring system for notifying the occurrence of a fire by collecting smoke density data, and more specifically, to a photoelectric smoke detector for determining the abnormality of a light emitting element, a light receiving element, a test light emitting element and the like by the comparison of the level difference between a zero point detection signal when the light emitting element is emitted and a zero point detection signal when the light emitting element is turned-off with a preset level difference, and the like.

2. Description of the Related Art

Nowadays, there have been widely used smoke detectors for detecting the occurrence of smoke in a monitored area and taking precautions against the possible spread of a fire. A photoelectric smoke detector is proposed as one of such smoke detectors.

A light emitting element and a light receiving element are disposed in the photoelectric smoke detector so that the optical axes thereof intersect with each other. An amount of the light received by the light receiving element when no smoke is generated is set to a zero point level. However, even if no smoke is generated, since the light generated by the light emitting element partly enters the light receiving element (which is referred to as noise light), the zero point level is not be perfect zero but has a positive value.

When smoke is generated, since the light scattered by the particles of the smoke is detected by the light receiving element, the amount of the light received by the light receiving element is increased from the zero point level. The photoelectric smoke detector detects the generation of smoke by detecting an increase of the amount of the light received by the light receiving element.

Conventionally, this type of the photoelectric smoke detector monitors the abnormality of light emitting elements, test light emitting elements and light receiving elements disposed therein as to the short circuit, release, deterioration and pollution thereof as well as carries out a test for confirming whether a peripheral circuit operates normally or not in order to ensure the detecting operation of the smoke detector when a fire happens.

Although the confirmation test includes a manual test effected by the use of a simple tester and an automatic test, when a lot of the photoelectric smoke detectors are deployed, the automatic test often being carried out because it is difficult to carry out the time-consuming manual test.

When a lot of the photoelectric smoke detectors are disposed in a disaster monitoring system, the automatic test is carried out using a control panel for receiving signals detected by the many photoelectric smoke detectors. More specifically, the control panel effects a polling control to send test commands to the respective photoelectric smoke detectors so that light is emitted by the light emitting elements. Then, whether the light emitted by the light emitting elements are properly received by the light receiving elements or not is confirmed to thereby test whether the light emitting elements, light receiving elements and a peripheral circuit disposed in the photoelectric smoke detector function normally or not. The operation of the light emitting elements, light receiving elements and the peripheral circuit disposed in the photoelectric smoke detectors is tested as described above.

In the above automatic test of the photoelectric smoke detector light from, the light emitting element is first emitted to obtain the aforesaid zero point level in the existence of noise light. Actually, the zero point level includes noise signals generated by the light receiving elements and amplifying circuit of the received lights in the respective photoelectric smoke detectors in addition to the noise light and the noise signals vary greatly by the change of an ambient temperature.

FIG. 9(A) shows the zero point levels of the photoelectric smoke detector when the ambient temperature is 0° C., 25° C. and 50° C. As described above, the zero point level is at the signal level obtained by adding a photoelectric conversion signal (shown by the shaded portion) which is the output signal of noise light generated by the emission of the light emitting element to the noise signal of the light receiving elements and the amplifying circuit of received lights. Among these signals, the level of the noise signal is increased as the ambient temperature increases to 0° C., 25° C. and 50° C., whereas, the level of the photoelectric conversion signal is unchanged.

Normal operation can be confirmed by setting a normal range between threshold values a, b on the both sides of the zero point level at the ambient temperature of 25° C. In this case, the normal operation can be confirmed from that both the zero point levels at 0° C. and 50° C. which are obtained by the test emission of the light emitting element are within the normal range of the threshold values a, b.

On the contrary, when the light emitting element and the like operates abnormally, the abnormal operation can be determined from that the photoelectric conversion signal shown by the shaded portion becomes zero and the zero point level is below the threshold value a at any of 0° C., 25° C. and 50° C.

However, the following problems arise when normal operation and abnormal operation are determined by the conventional test emission in the photoelectric smoke detector. First, S/N ratio is recently increased by sufficiently reducing the level of noise light resulting from light emission effected in the state of no smoke by the improvement of the smoke detecting structure of the photoelectric smoke detector. For example, the level of the photoelectric conversion signal as the output signal of noise light occupied in the zero point level is relatively reduced as compared with the level of an electric noise signal as shown in FIG. 9(B).

Consequently, when the normal range is set to a narrow area between the threshold values a', b' on the both sides of the zero point level at the ambient temperature of 25° C. likewise the case of FIG. 9(A), since the zero point level at 0° C. obtained by the test light emission of the light emitting element is below the threshold value a', the operation of the photoelectric smoke detector is erroneously determined abnormal, whereas erroneous determination is also made as to the zero point level at 50° C. which exceeds the threshold value b', thus it is difficult to make correct determination.

On the contrary, when the normal range is increased as shown in FIG. 9(C), even if the light emitting element and the like are made abnormal and the photoelectric conversion signal shown by the shaded portions are made zero, the zero point levels at the ambient temperatures 25° C., 50° C. are not below the threshold value a" and within the normal range, even if the light emitting element and the like operate abnormally, they are erroneously determined to operate normally. As described above, it is difficult to determine normal operation and abnormal operation simply depending upon whether the zero point level is within a predetermined range or not.

Although it is contemplated to determine normal operation by setting threshold values at respective temperatures, its arrangement is made complex because the circumferential temperatures of the respective detecting elements must be measured.

As described above, when the level of the photoelectric conversion signal compared with the level of an electric noise signal. is lowered, there arises a problem as to whether the light emitting element, the light receiving element and the peripheral circuit are normal or abnormal can in fact be determined by the test operation carried out based on the zero point output whose normal range is set by the threshold values.

SUMMARY OF THE INVENTION

An object of the present invention for solving the above conventional problems is to provide a highly reliable photoelectric smoke detector by which the detection of whether elements and peripheral circuits are good or bad, polluted or abnormal can be securely tested without being affected by the dispersion of light emitting elements and light receiving elements and the variation of ambient temperatures even if the ratio of noise light occupied in a zero point level is reduced.

To achieve the object, the photoelectric smoke detector of the present invention is arranged as described above.

The present invention includes a light emitting element for detecting smoke and a light receiving element for receiving the light emitted from the light emitting element and outputting a detection signal obtained by photoelectrically converting the received light, and a light emission controller outputs a drive pulse for controlling the light emission and the turning-off of the light emitting element to test the operation of the light emitting element and the light receiving element. A calculation and comparison unit calculates the level difference or the level ratio between the light emission zero point detection signal from the light receiving element which has received the light from the light emitting element and the turning-off zero point detection signal from the light receiving element when the light emitting element is turning-off and compares the level difference or the level ratio with a preset determination level. Then, a determination unit determines the normality or the abnormality of the operation of the light emitting element, the light receiving element and a peripheral circuit from the result of comparison effected by the calculation and comparison unit.

With this arrangement, whether the light emitting element, the light receiving element and the peripheral circuit are good or bad can be reliably determined without the effect of the dispersion of the light emitting element and the light receiving element and the change of an ambient temperature in the present invention. Further, a temperature need not be measured and an overall arrangement can be simplified.

The present invention preferably includes a light emitting element for detecting smoke, a test light emitting element for emitting light for carrying out a test and a light receiving element for receiving the light emitted from the light emitting element and the test light emitting element and outputting a detection signal obtained by photoelectrically converting the received light, and a light emission controller outputs a drive pulse for controlling the light emission of the light emitting element and the test light emitting element to determine the abnormality of the light emitting element, the test light emitting element and the light receiving element and the pollution and the like of the light receiving element.

Then, a calculation and comparison unit calculates the level difference or the level ratio between the light emission zero point detection signal from the light receiving element which has received the light from the light emitting element and the test detection signal from the light receiving element resulting from the reception of the light when the test light emitting element is emitted and compares the level difference or the level ratio with a preset determination level. A determination unit determines the abnormal pollution of the detection light emitting element, the test light emitting element and the light receiving element from the result of the comparison.

Consequently, the deterioration of the respective elements and the abnormal pollution of the light emitting element can be determined in addition to the abnormal operation of the light emitting element, the test light emitting element and the light receiving element.

The photoelectric smoke detector is preferably provided with a data rewriting memory such as a readable/writable EEPROM or the like for setting a determination level to be compared with the level difference or the level ratio thereto. As a result, a determination level corresponding to the environment where the photoelectric detector is installed can be set, whereby the versatility of the photoelectric detector can be improved.

Preferably, the zero point detection signal output from the light receiving element is added with the drive pulse for control output from the light emission controller to thereby determine abnormality by adjusting the level of the zero point detection signal to a reference level needed by an MPU for D/A conversion. As a result, the level of the zero point detection signal can be adjusted to the effective region of the D/A conversion by the use of a less expensive operational amplifier without the need of increasing the degree of amplification of a light amplifying circuit.

Further, a plurality of the photoelectric smoke sensors connected to a control panel are used to a disaster monitoring system as well as a transmission/reception circuit is disposed to the respective photoelectric smoke detectors to transmit and receive data to and from the control panel. The light emission controller carries out a test in response to an A/D conversion command output from the control panel and received by the transmission/reception circuit as well as the determination result data made by the determination unit is transmitted to the control panel through the transmission/reception circuit together with address data for identifying each of the photoelectric smoke detectors. Therefore, in the disaster monitoring system using the photoelectric smoke detectors of the present invention, since the detectors carry out test operation by themselves in response to the A/D conversion command from the control panel indicating the collection of data, the test operation is steadily carried out and thus the abnormality of the detectors can be found at an earlier stage, whereby the reliability thereof is improved.

Further, since the control panel need not issue a test command, a control load imposed on the control panel can be reduced.

BRIEF DESCRIPTION OF THE DRAWINGS

FIG. 9 are views explaining the state of variation of a zero point level in a conventional photoelectric smoke detector, wherein

DETAILED DESCRIPTION OF THE PREFERRED EMBODIMENTS

Figure 1:
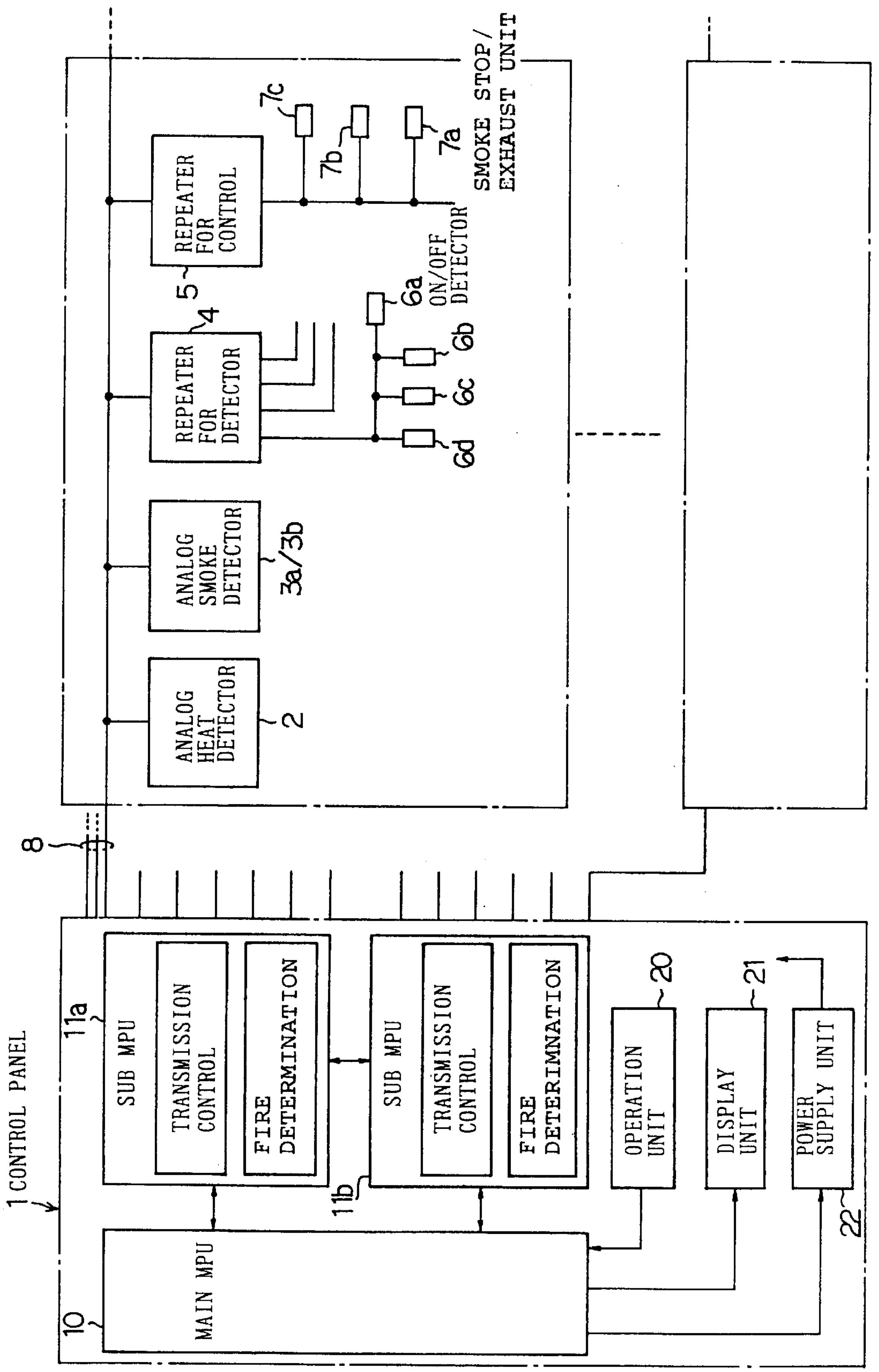
FIG. 1 is a block diagram showing an example of the arrangement an automatic fire alarm system to which a photoelectric smoke detector of the present invention is applied.

FIG. 1 is a block diagram showing an automatic fire alarm system to which a photoelectric smoke detector of the present invention is applied. In FIG. 1, the automatic fire alarm system disposed in a building and the like has a control panel 1 disposed in a management room and monitors a fire as well as energizes an emergency bell or notifies emergency and the like by a synthesized voice when a fire happens.

The control panel 1 is composed of, for example, a multiple MPU which includes a main MPU 10 for managing and controlling the control panel 1 as a whole and sub MPUs 11*a*, 11*b* for collecting information from a terminal connected to each of, for example, 8 circuits and controlling the terminal under the control of the main MPU 10, the sub MPUs 11*a*, 11*b* also having a data transmission function, a fire determination function and the like.

The control panel 1 further includes an operation unit 20 connected to the main MPU 10 for effecting various settings, a display unit 21 for displaying the layouts of automatic fire alarms disposed to the respective floors of the building, the set contents of the fire alarms, and the automatic fire alarm notified emergency in an illuminated state and a power supply unit 22 for receiving necessary DC power from a commercial power supply and connected to an emergency battery, a generator and the like.

The automatic fire alarm system is provided with an analog heat detector 2 for detecting a fire and supplying terminal information together with the address of the terminal thereof and an analog photoelectric smoke detector 3*a* having a self-diagnosis function (hereinafter, referred to as an analog smoke detector 3*a*).

Further, the automatic fire alarm system is provided with a repeater for detector 4 and a repeater for control 5 which are connected to the control panel 1 through, for example, a transmission path 8 composed of 3 circuits (a data transmission line, a power supply line, a common ground line and the like). On/off detectors 6*a*, 6*b*, 6*c*, 6*d* are connected to the repeater for detector 4 and further smoke stop/exhaust units 7*a*, 7*b*, 7*c* are connected to the repeater for control 5.

Figure 2:
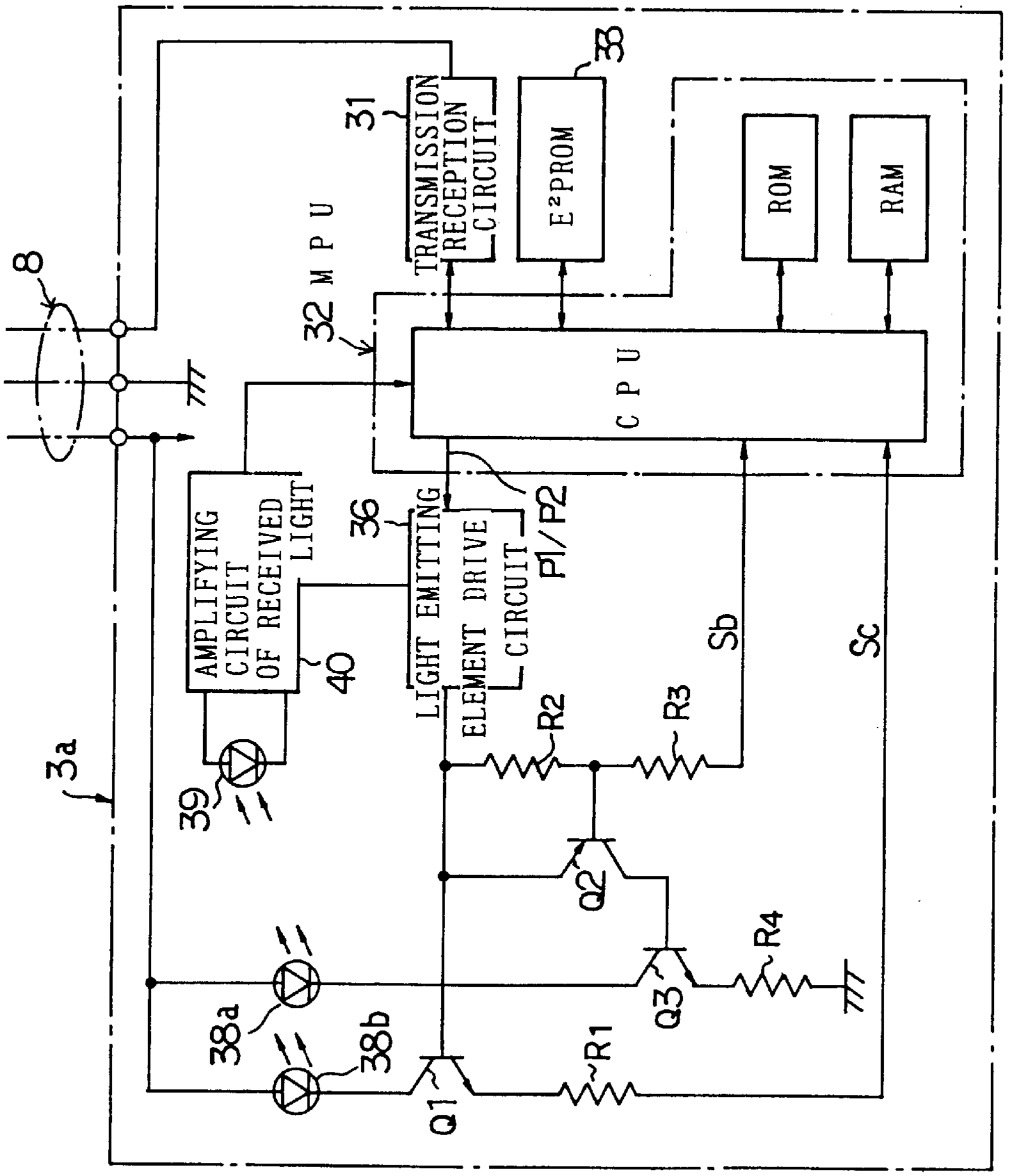
FIG. 2 is a block diagram showing the detailed arrangement of an analog smoke detector of a first embodiment.

FIG. 2 is a block diagram of the analog smoke detector 3*a* of the first embodiment. In FIG. 2, the analog smoke detector 3*a* includes a transmission/reception circuit 31 for receiving an A/D conversion command and the like from the control panel 1 through the transmission path 8, the command being used to collect data in the smoke detecting unit in the analog smoke detector 3*a* and testing the same and further transmitting the detected data as a test result to the control panel 1. The smoke detecting unit is composed of a light emitting element 38*a*, a test light emitting element 38*b*, a light receiving element 39, a light emitting element drive circuit 36, a amplifying circuit of received light 40 and transistors Q1, Q2, Q3. Note, the function of the light emitting element 38*a* and the like will be described later.

The analog smoke detector 3*a* is further provided with a MPU 32 which includes a CPU for controlling the respective portions of the analog smoke detector 3*a*, a ROM storing determination levels for determining whether a control program and the smoke detecting unit to be described later are normal or abnormal, a working RAM and the like. Further, an EEPROM 33 is externally connected to the MPU 32 to prestore various control operation data, determination levels and the like.

Further, the analog smoke detector 3*a* includes the light emitting element control circuit 36 for outputting a drive pulse based on the light emission control pulses SP1, SP2 output from the MPU 32 and the light emitting element 38*a* for emitting light for receiving dispersed light caused by smoke generated by a fire and the like. In addition, the analog smoke detector 3*a* includes the test light emitting element 38*b* for emitting light in the state of no smoke, the light receiving element 39 for subjecting the smoke-dispersed light from the light emitting element 38*a* and the light incident from the test light emitting element 38*b* to photoelectric conversion and the amplifying circuit of received light 40 for amplifying a signal (photoelectric conversion signal) detected from the light receiving element 39.

A drive signal, which is applied from the light emitting element drive circuit 36 to the light receiving/amplifying circuit 40, is added to a light receiving signal so as to adjust an input voltage needed by the MPU 32 for A/D conversion and the light receiving signal subjected to the level adjustment is output to the MPU 32.

Further, the analog smoke detector 3*a* includes the transistor Q1 for turning on and off the test light emitting element 38*b* by being switched in response to the drive pulse from the light emitting element drive circuit 36, a current restricting resistor R1 connected between the emitter of the transistor R1 and the ground, the transistor Q2 for turning on and off the light emitting element 38*a* by being switched in response to the drive pulse from the light emitting element drive circuit 36, the transistor Q3, bias setting resistors R2, R3 and a current restricting resistor R4 connected between the emitter of the transistor Q3 and the ground.

Next, operation of the embodiment 1 of FIG. 2 will be described.

Figure 3:
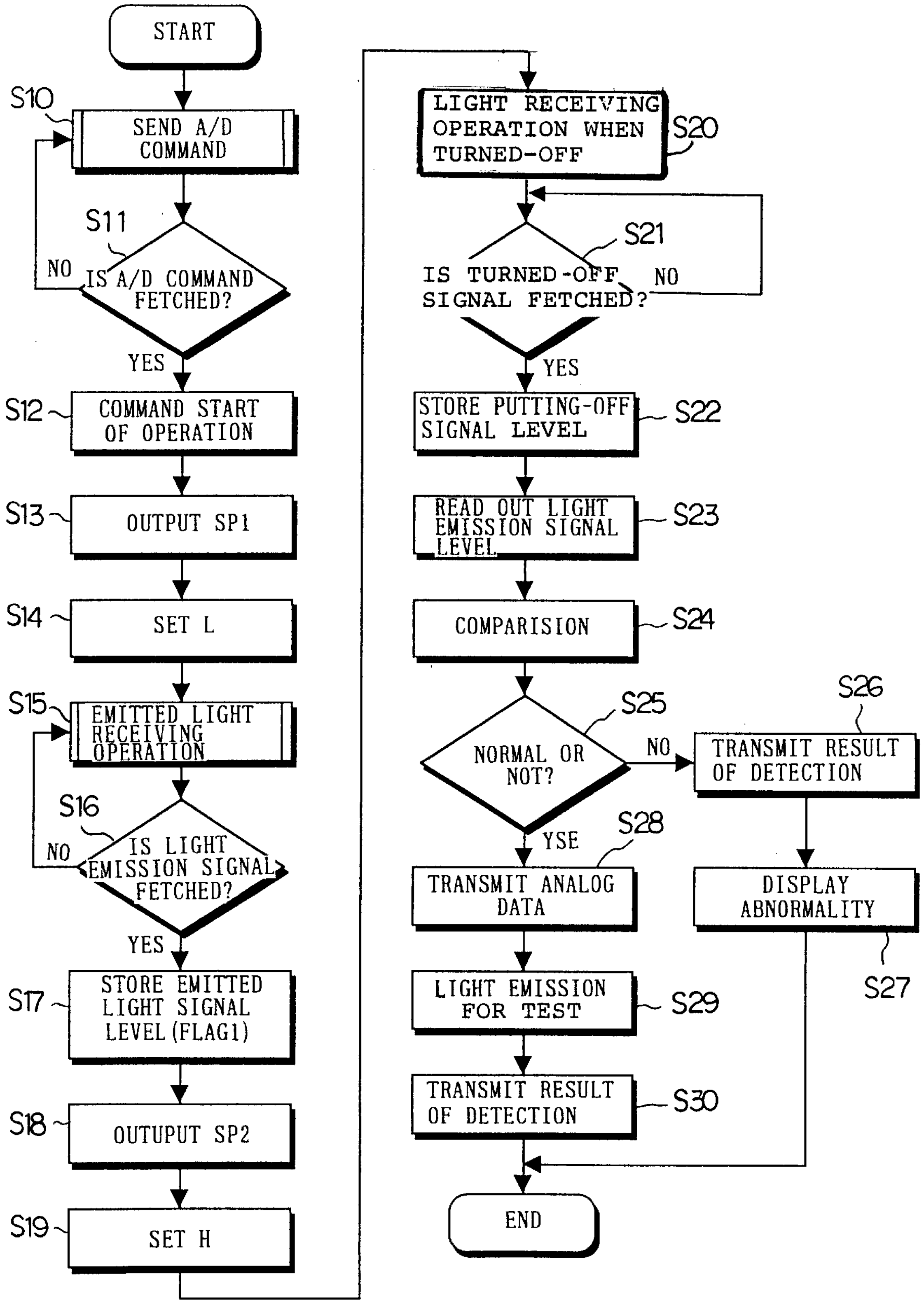
FIG. 3 is a flowchart showing the processing sequence of operation of the analog smoke detector in the first embodiment.

FIG. 3 is a flowchart showing the processing sequence of operation of the smoke detector 3*a* in the first embodiment and FIG. 4 is a timing chart showing the processing waveform of operation of the first embodiment and its timing. The first embodiment determines whether the light emitting element 38*a*, the test light emitting element 38*b*, the light receiving element 39, the light emitting element drive circuit 36, the amplifying circuit of received light 40, the transistors Q1–Q3 and the like each disposed in the smoke detecting unit normally operate or not. Note, in FIG. 3, a light emitting zero point detection signal is simply shown as a light emitting signal and a turning-off zero point detection signal is simply shown as a turning-off signal.

Figures 4A, 4B, 4C, 4D:
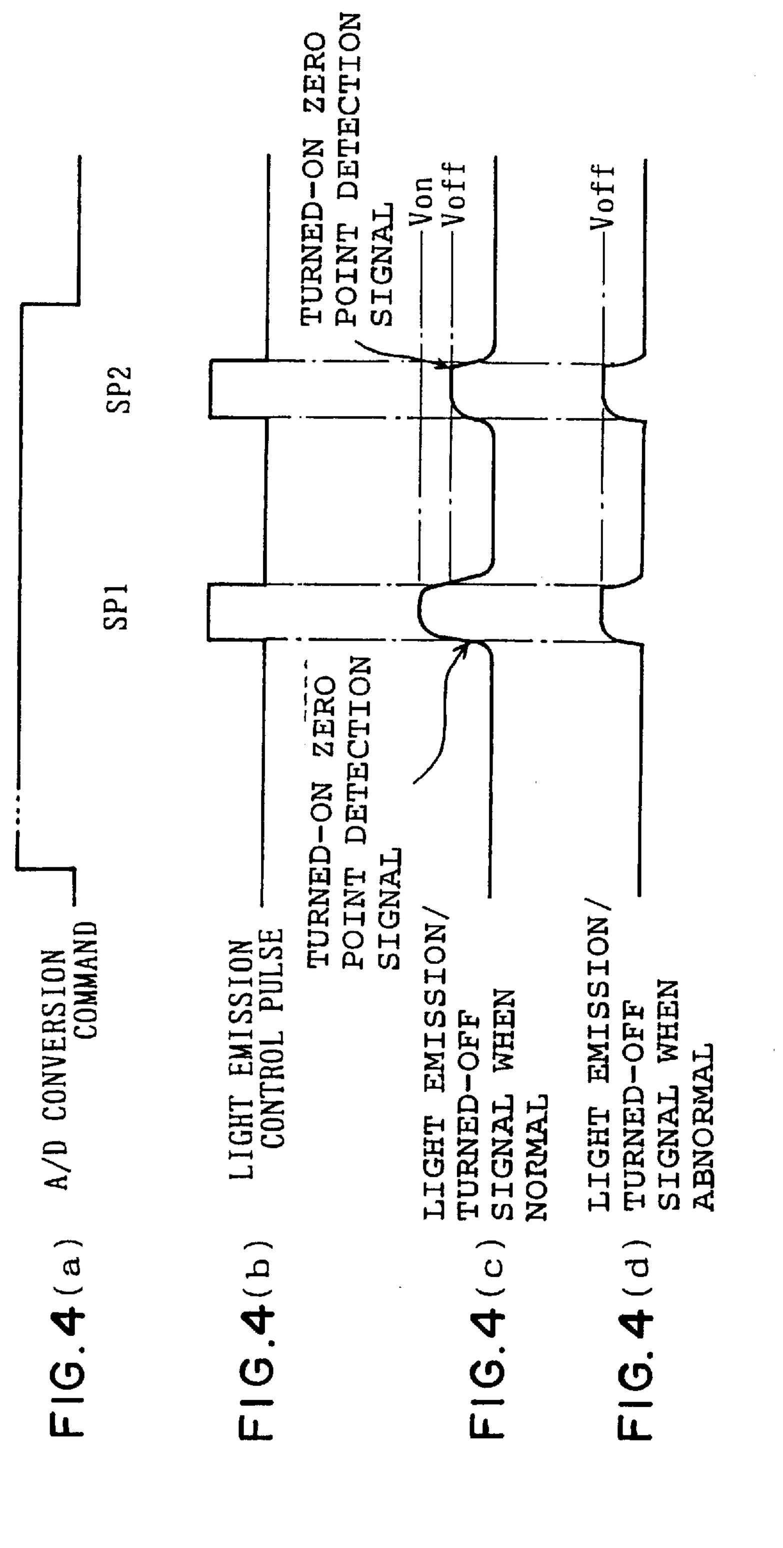
FIG. 4 is a timing chart showing the processing waveform of operation of the first embodiment and its timing; wherein FIG. 4(*a*) shows A/D conversion command, FIG. 4(*b*) shows light emission control pulse, FIG. 4(*c*) shows light emission/putting-off signal when normal, and FIG. 4(*d*) light emission/putting-off signal when abnormal.

In FIG. 3, the A/D conversion signal shown in FIG. 4(A) is sent from the control panel 1 to the transmission path 8 at step S10 to confirm whether the smoke detecting unit of the smoke detector 3*a* normally operates or not. The A/D conversion command is sent at a cycle of, for example, one minute. Further, the A/D conversion command has a common address so that it can be received by all the detectors.

When the MPU 32 fetches and recognizes the A/D conversion command from the control panel 1 through the transmission/reception circuit 31 of FIG. 2 at step S11, the amplifying circuit of received light 40 is instructed to start operation at step S12. Next, the MPU 32 outputs the light emission control pulse SP1 shown in FIG. 4(*b*) from an output port to the light emitting element drive circuit 36 at step S13 to cause the light emitting element 38*a* to emit light.

At step S14, a drive pulse corresponding to the light emission control pulse SP1 is sent from the light emitting element drive circuit 36 to the transistor Q2 and the amplifying circuit of received light 40. The input port of a smoke detection light emission control signal Sb is set to L level at the same time the light emission control pulse SPI is sent. As a result, the transistors Q2, Q3 are turned on and the light emitting element 38*a* emits light at step S15.

When the emitted light is received by the light receiving element 39 and the photoelectric conversion signal thereof is amplified by the amplifying circuit of received light 40. Further, the drive pulse from the light emitting element drive circuit 36 is added to the detection signal to adjust the level thereof (the level adjustment will be described later) and output to the input port of the MPU 32 as a light emission zero point detection signal when the light emitting element 38*a* shown in FIG. 4(*c*) emits light. At step S16, the MPU 32 subjects the light emission zero point detection signal to A/D conversion and determines whether it is fetched or not. At step S17, the level of the light emission zero point detection signal is stored to the RAM as well as a flag 1 is set up.

At next step S18, the light emission control pulse SP2 shown in FIG. 4(*b*) is output to the light emitting element drive circuit 36 to obtain a zero point output in the turning-off state of the light emitting element 38*a*. At step S19, the input port of the smoke detection light emission control signal Sb is set to H level simultaneously with the sending of the light emission control pulse SP2 to thereby turn off the transistor Q3.

At next step S20, a signal showing the noise level of the light receiving element 39 when the detection light emitting element 38*a* is turned-off is added to the drive pulse from the light emitting element drive circuit 36 to adjust the level thereof and then output to the input port of the MPU 32 as the turned-off zero point detection signal of the light emitting element 38*a* shown in FIG. 4(*c*). At step S21, the MPU 32 determines whether the turned-off zero pint detection signal is fetched or not and at step S22 the level of the turned-off zero point detection signal is stored to the RAM.

At next step S23, the respective levels of the light emission zero point detection signal to which the flag 1 was set up and the turned-off zero point detection signal are read out from the RAM and they are compared with each other at step S24. In this case, when the light emitting element 38*a* normally emits light and the light receiving element 39 normally receives the light in response to the light emission control pulse SP1, the light emission zero point detection signal becomes Von+Voff shown in FIG. 4(*c*). Note, Von corresponds to the photoelectric conversion signal of noise light and Voff corresponds to an electric noise signal whose level is adjusted by the addition of a drive pulse.

When the detection light emitting element 38*a* is turned-off in response to the light emission control pulse SP2, the turned-off zero point detection signal becomes Voff which depends only on the electric noise signal. Therefore, the level difference (Von_Voff) shown in FIG. 4(*c*) is compared with the good or bad determination level prestored to the ROM of the MPU 32 to thereby determine whether the detection light emitting element 38*a*, the test light emitting element 38*b*, the light receiving element 39, the light emitting element drive circuit 36, the amplifying circuit of received light 40, the transistors Q1–Q3 of the smoke detecting unit are abnormal or not.

When the smoke detecting unit is abnormal here, the result shown in FIG. 4 is obtained. That is, when the light emitting element 38*a* is not emitted in response to the light emission control pulse SP1, when a photoelectric conversion signal (detection signal) cannot be obtained by the light receiving element 39 because the light emitted from the light emitting element 38*a* is very weak, when the light receiving element 39 is faulty, and further when the peripheral circuit effects faulty operation, the light emission zero point detection signal is at the level Voff which depends only on the noise signal as shown in FIG. 4(*d*).

When the detection light emitting element 38*a* is turned-off, since the turned-off zero point detection signal in response to the light emission control pulse SP2 is also at the level Voff which depends only on the noise signal, there is no level difference (Von_Voff). In this case, the smoke detection light emitting element 38*a*, the light receiving element 39, the light emitting element drive circuit 36, the amplifying circuit of received light 40, the transistors Q2, Q3 and the like are determined abnormal.

At next step S25, whether the test results up to that time are normal or not is determined and when they are determined abnormal, data indicating the abnormality is transmitted to the control panel 1 at the timing of polling from the control panel 1 at next step S26 through the transmission/reception circuit 31 and the transmission path 8 of FIG. 2 together with the intrinsic address data of the photoelectric smoke detector 3*a*. Then, the abnormality of the detector is displayed on the display unit 21 such as, for example, the liquid crystal display (LED) of the control panel 1 together with the address of the detector at step S27. On the other hand, when the test results are determined normal at step S25, analog data of smoke detected by the detector itself is transmitted to the control panel 1 at the timing of polling from the control panel 1.

Subsequently, the test light emitting element 38*b* is tested at step S29. The light emission test of the test light emitting element 38*b* is effected by interpreting a test command periodically transmitted from the control panel 1 likewise the test of a conventional system and the results of the test are transmitted to the control panel 1 at step S30.

Figure 5:
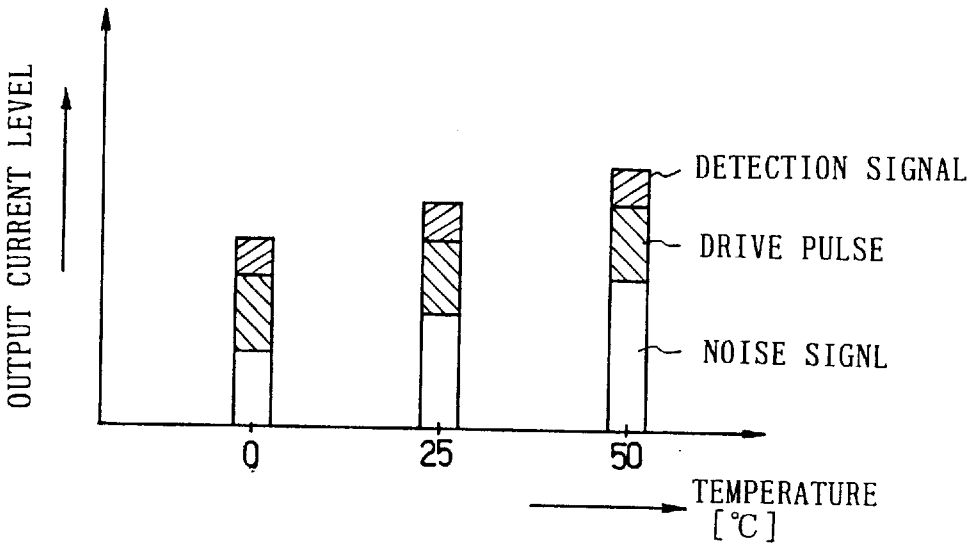
FIG. 5 is a graph showing temperature versus output current level when a detection signal is at a low level in the operation of the first embodiment.

FIG. 5 shows in detail the level adjustment achieved by the addition of a drive pulse to the signal received by the amplifying circuit of received light 40. In the photoelectric smoke detector of the present invention, the noise light depending upon the internal reflection of light incident on the light receiving element caused by the light emission effected when no smoke flows is greatly reduced by the improvement of the smoke detection structure. As a result, the photoelectric conversion signal occupied in the light emission zero point detection signal of FIG. 5 is greatly reduced, and it is unchanged even if an ambient temperature changes to 0° C., 25° C., 50° C.

Whereas, the noise signal increases as the ambient temperature increases to 0° C., 25° C., 50° C. However, the zero point output obtained by the synthesization of the photoelectric conversion signal of the noise light and the noise signal has a low level and the input level thereof when fetched by the A/D conversion of the MPU 32 is too low. To cope with this problem, the drive pulse from the light emitting element drive circuit 36 is added to the zero point output by the amplifying circuit of received light 40 to increase the level thereof so that the level is biased to the reference input level of the A/D conversion of the MPU 32. The adjustment of the input voltage enables the degree of amplification of the amplifying circuit of received light 40 to be set to a necessary minimum level, whereby an operational amplifier can be arranged at a low cost.

It is needless to say that if amplification to the signal level needed by the A/D conversion can be achieved by the amplifying circuit of received light 40, the level adjustment by the addition of the drive pulse is not necessary.

Further, although the abnormality of the light emitting element 38*a*, the light receiving element 39 and the peripheral circuit is determined by the level difference (Von_Voff) between the light emission zero point detection signal and the turned-off zero point detection signal in the first embodiment, the abnormality of the smoke detecting unit may be determined by the comparison of their level ratio (Von/Voff) with a determination level in place of the level difference.

Figure 6:
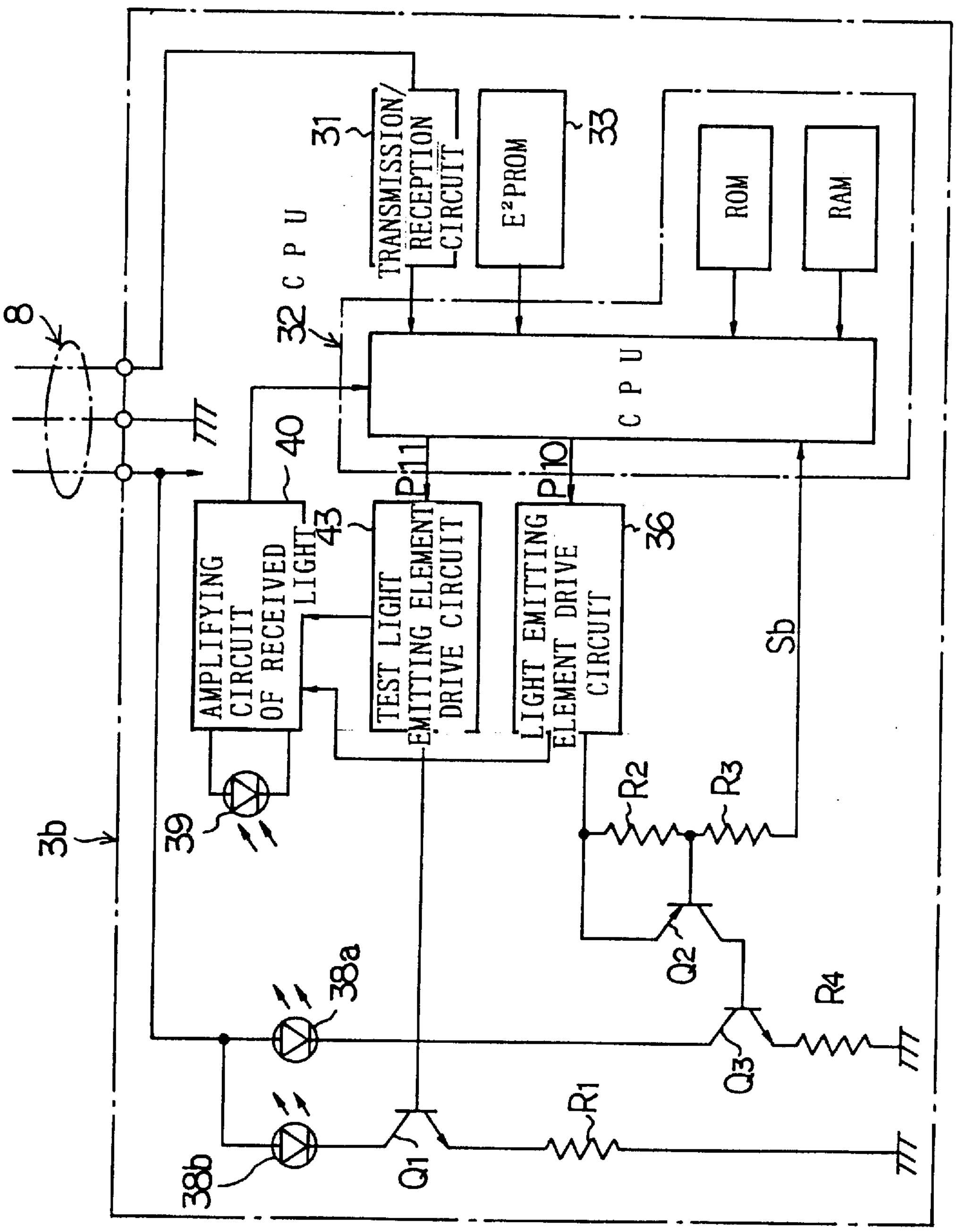
FIG. 6 is a block diagram of the detailed arrangement of an analog smoke detector of a second embodiment.

FIG. 6 is a block diagram of an analog smoke detector 3*b* of a second embodiment. In FIG. 6, the second embodiment can determine the deterioration and pollution of the light emitting element 38*a*, the test light emitting element 38*b* and the light receiving element 39 of a smoke detecting unit in addition to the abnormality thereof. The analog smoke detector 3*b* is different from the analog smoke detector 3*b* of the first embodiment shown in FIG. 2 in that a test light emitting element drive circuit 43 is provided to drive a transistor Q1 for switching the test light emitting element 38*b* as well as the emitter of the transistor Q1 is grounded through a resistor R1 and the test light emitting element 38*b* is switched in response to the drive pulse from the test light emitting element drive circuit 43. The other arrangement of the second embodiment is the same as that of the first embodiment shown in FIG. 2.

Figure 7:
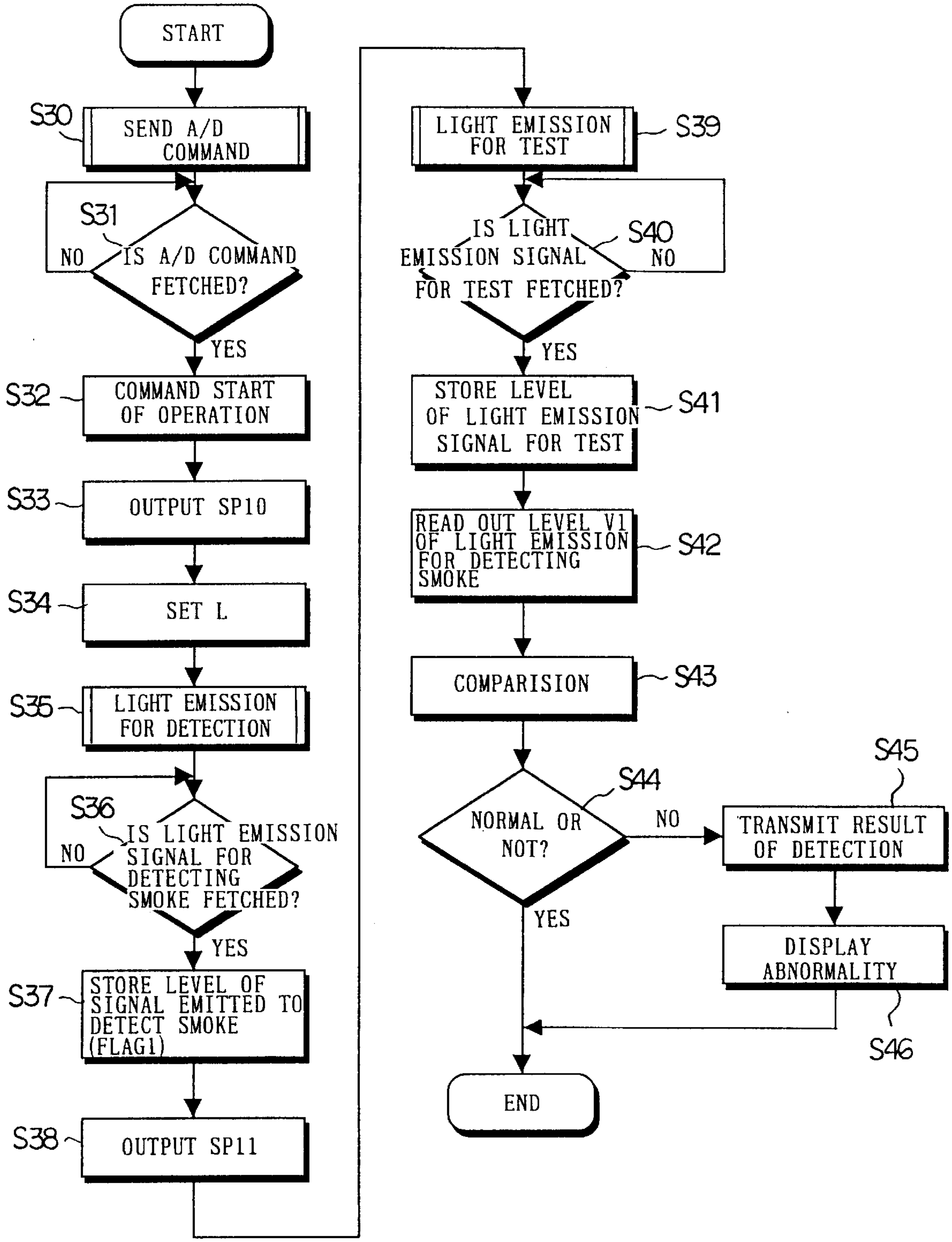
FIG. 7 is a flowchart showing the processing sequence of operation of the analog smoke detector in the second embodiment.
Figures 8A, 8B, 8C, 8D:
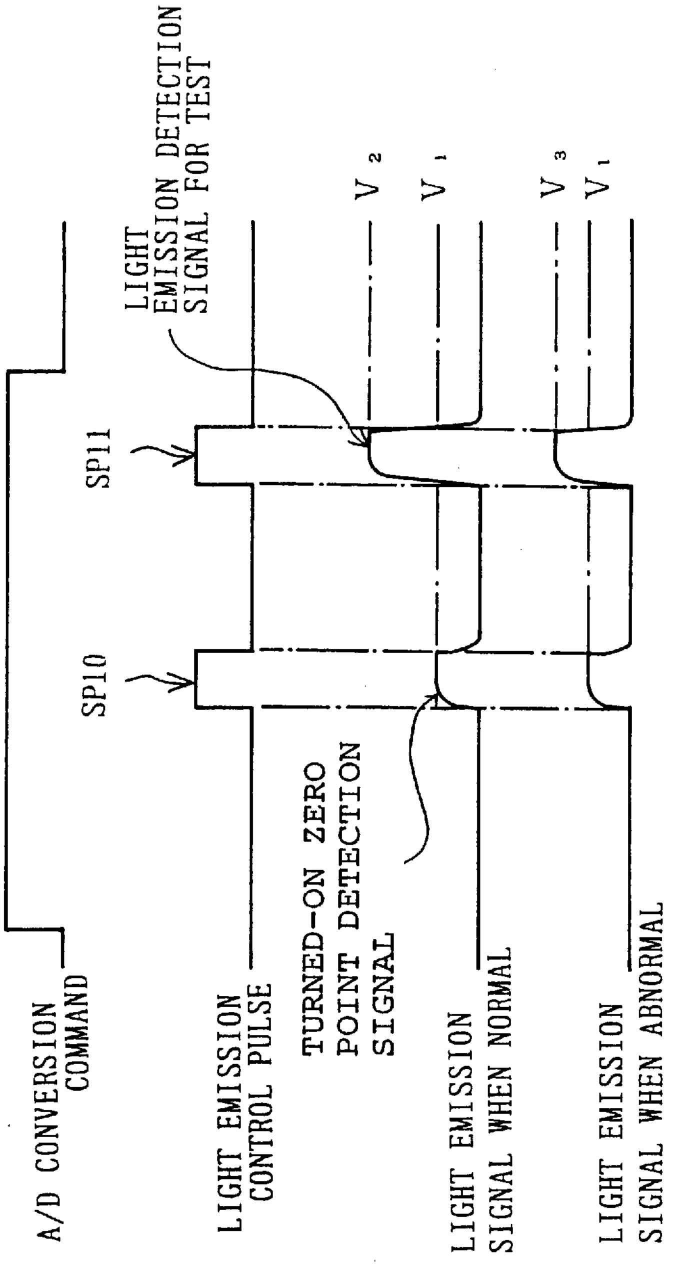
FIG. 8 is a timing chart showing the processing waveform of operation of the second embodiment and its timing and, wherein FIG. 8(*a*) show A/D conversion command, FIG. 8(*b*) shows light emission control pulse, FIG. 8(*c*) light emission signal when normal, and FIG. 8(*d*) light emission signal when abnormal.
Figure 9A:
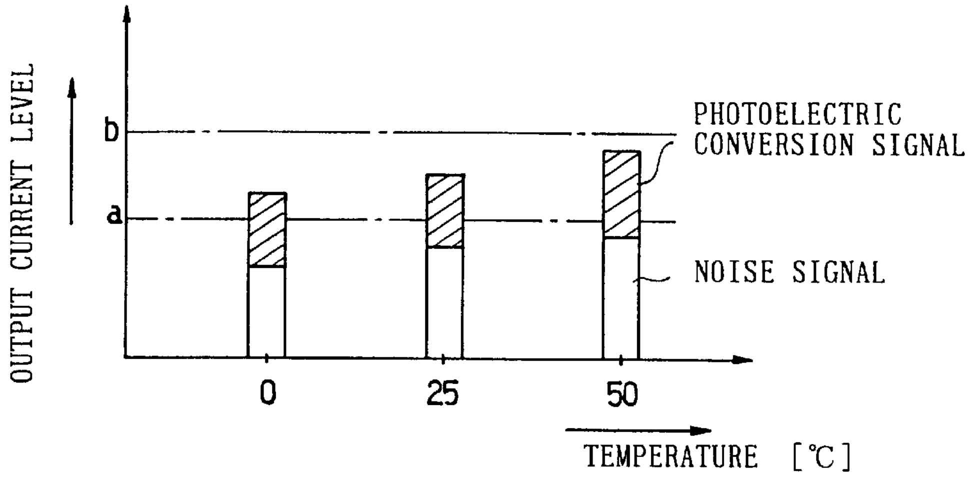
FIG. 9(A) shows a state before noise light is reduced and FIGS. 9(B), 9(C) show states after the noise light is reduced.
Figure 9B:
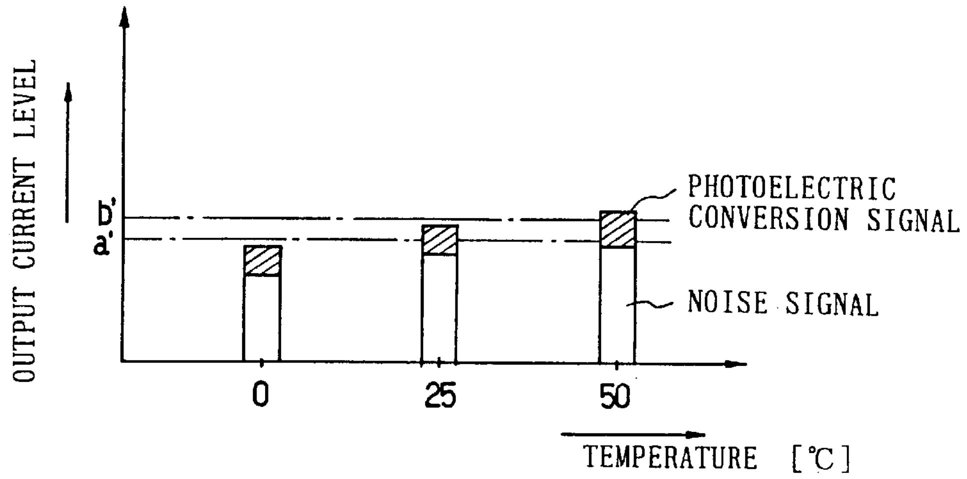
Figure 9C:
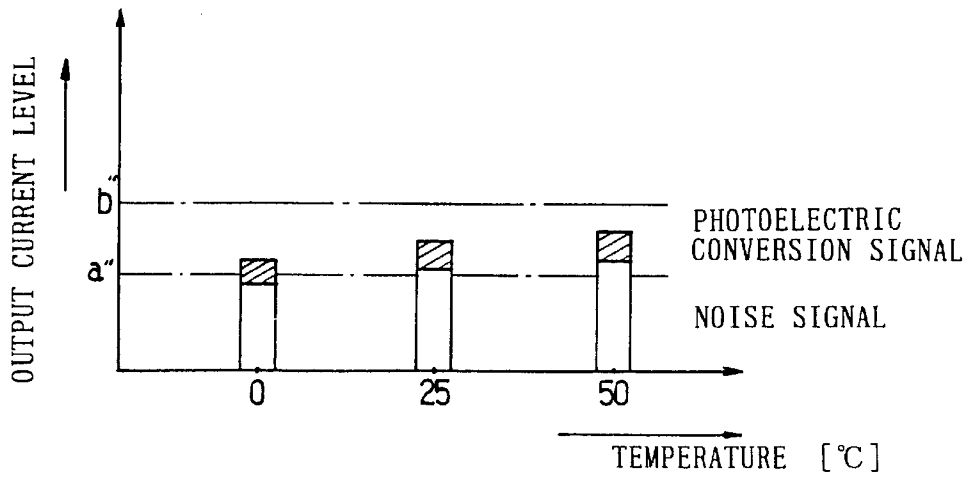

Next, operation of the second embodiment will be described. FIG. 7 is a flowchart showing the processing sequence of operation of the analog smoke detector 3*b* in the second embodiment and FIG. 8 is a timing chart showing the processing waveform of operation of the second embodiment and its timing.

In FIG. 7, an A/D conversion command is sent from a control panel 1 through a transmission path 8 likewise the first embodiment at step S30, the A/D command is fetched at step S31 and a amplifying circuit of received light 40 is commanded to start operation at step S32. Next, at step S33, an MPU 32 outputs the light emission control pulse SP10 shown in FIG. 8(*b*) to a light emitting element drive circuit 36 from an output port to emit the light emitting element 38*a*.

At step S34, the light emitting element drive circuit 36 sends a drive pulse corresponding to the light emission control pulse SP10 to a transistor Q2 and a light receiving/amplifying circuit 40. At the same time, the input port of a smoke detection light emission control signal Sb is set to L level, the transistor Q2 and a transistor Q3 are turned on, and the light emitting element 38*a* is emitted at step S35.

The emitted light is received by a light receiving element 39 and the photoelectrically-converted signal thereof is amplified by the amplifying circuit of received light 40. The level of the amplified signal is adjusted by being added with the drive pulse from the light emitting element drive circuit 36 and the amplified signal is output to the input port of the MPU 32 as the light emission zero point detection signal (level V1) shown in FIG. 8(*c*) when the detection light emitting element 38*a* is emitted.

At step S36, the MPU 32 fetches the light emission zero point detection signal after subjecting it to A/D conversion and the level of the light emission zero point detection signal is stored to a ROM as well as a flag 1 is set up. At next step S38, the light emission control pulse SP11 shown in FIG. 8(*b*) is output to the test light emitting element drive circuit 43 to emit the test light emitting element 38*b*.

At step S39, the test light emitting element drive circuit 43 sends a drive pulse having the same level as that of the drive pulse of the light emitting element drive circuit 36 to the base of the transistor Q1 and the amplifying circuit of received light 40 to thereby turn on the transistor Q1 so that the test light emitting element 38*b* is emitted. The emitted light is received by the light receiving element 39, the photoelectrically-converted signal thereof is amplified by the amplifying circuit of received light 40 with the level thereof adjusted by being added with the drive pulse of the test light emitting element drive circuit 43 and output to the input port of the MPU 32 as the test light emission detection signal (level V2) shown in FIG. 8(*c*) when the test light emitting element 38*b* is emitted.

At step S40, the MPU 32 fetches the test light emission detection signal after subjecting it to A/D conversion and the level V2 thereof is stored to a RAM at step S41.

At next step S42, the level V1 of the smoke detection light emission zero point detection signal to which the flag 1 was set up is read out from the RAM and compared with the level V2 of the test light emission detection signal at step S43. In this case, the received light when the light emitting element 38*a* is emitted is noise light due to the inner reflection of light not directly incident on the light receiving element 39 as shown in FIG. 8(*c*). Consequently, the light emission zero point detection signal for detecting smoke is made to a low level like the level V1. Further, since the light emitted from the test light emitting element 38*b* is directly received by the light receiving element 39, the level of the test light emission detection signal is large like the level V2 and at a prescribed level unless it is not polluted.

The level difference (V2_V1) shown in FIG. 8(*c*) is compared with the determination level prestored to the ROM of the MPU 32 to thereby determine the abnormality of the light emitting element 38*a*, the test light emitting element 38*b* and the light receiving element 39 of the smoke detecting unit. The level difference (V2_Vi) is compared with, for example, a determination level for determining abnormality due to pollution and when it is less than the determination level, it is determined that the light receiving surface of the light receiving element 39 is polluted by smoke and the like deposited thereon.

When the determination level is set to a lower value, the abnormality of the light emitting element 38*a,* the test light emitting element 38*b*, the light receiving element 39 and the amplifying operation (lowered degree of amplification) and the like of the light receiving/amplifying circuit 40 can be also determined. When they are determined abnormal at next step S44, abnormal data is transmitted to the control panel 1 through the transmission/reception circuit 31 and the transmission path 8 of FIG. 2 together with an address intrinsic to the analog smoke detector 3*b* at the timing of polling from the control panel 1 at next step S45. Then, the address of the smoke detector and the content of abnormality are displayed on, for example, the liquid crystal display, of the display unit 21 of the control panel 1 at step S46.

Note, the abnormality may be also determined by the comparison of a level ratio (V2/V1) with the determination level in place of the determination of the abnormality effected by the level difference (V2_V1) between the light emission zero point detection signal and the test light emission detection signal.

Further, whether the smoke detecting unit operates normally or abnormally and whether it is abnormally polluted or not is determined based on the determination level stored to the ROM of the MPU 32 in the first and second embodiments. However, the determination level may be stored to a readable/writable EEPROM 33 as an external circuit to the MPU 32 and compared with the level difference or the level ratio. Since a good/bad determination level can be easily rewritten in the EEPROM 33, the level can be set in accordance with the environment where the analog smoke detectors 3*a*, 3*b* are installed by installing the EEPROM 33 after the installation of the smoke detectors 3*a*, 3*b*.

That is, with this arrangement, whether the smoke detecting unit operates normally or abnormally and whether it is abnormally polluted or not can be determined accurately by the determination level set corresponding to the positions where the respective elements are installed and the detection error of the analog smoke detectors 3*a*, 3*b*, in other words, there can be obtained an advantage that the versatility of the apparatus can be improved.

Further, although test operation is carried out in response to the A/D conversion command transmitted from the control panel in the above embodiments, a dedicated test command may be automatically sent at preset intervals such as, for example, each one hour, each one day or the like or only the necessary analog smoke detectors among many detectors may be frequently tested. It is needless to say that the test can be carried out by manually sending a test command through the operation unit 20 shown in FIG. 1.

Although the smoke detecting unit is tested in response to the A/D conversion command from the control panel, the analog smoke detectors 3*a*, 3*b* may be tested by themselves without using the command from the control panel. In this case, the test is carried out at a prescribed time or at prescribed intervals through a timer or the like disposed in the analog smoke detectors 3*a*, 3*b*, the result of the test is stored in the RAM of the MPU 32 and the stored data is read out in response to the polling control command from the control panel 1 and transmitted through the transmission/reception circuit 31.

What is claimed is:

1. A photoelectric smoke detector, comprising:

a light emitting element for emitting light;

a light receiving element for receiving the light emitted from said light emitting element and outputting a detection signal obtained by photoelectrically converting the received light;

a light emission controller for outputting a drive pulse for controlling the light emission from said light receiving element by selectively turning on and turning off said light emitting element to test the operation of said light emitting element and said light receiving element;

a calculation and comparison unit for calculating the level difference or the level ratio between a light emission zero point detection signal from said light receiving element which has received the light from said light emitting element and a turned-off zero point detection signal from said light receiving element when said light emitting element is turned off and comparing the level difference of the level ratio with a predetermined level; and a determination level for determining the normality or the abnormality of the operation of said light emitting element, said light receiving element and a circuit which is related to the generation of said light emitting element and the said light receiving element from the result of comparison effected by said calculation and comparison unit.

2. A photoelectric smoke detector, comprising:

a light emitting element for emitting light;

a test light emitting element for emitting light for carrying out a test;

a light receiving element for receiving the light emitted from said light emitting element and said test light emitting element and outputting a detection signal obtained by photoelectrically converting the received light;

a light emission controller for outputting a drive pulse for controlling the light emission from said light emitting element by selectively turning on and turning off said light emitting element and said test light emitting element to determine the abnormality of said light emitting element, said test light emitting element and said light receiving element and the pollution and the like of said light receiving element;

a calculation and comparison unit for calculating the level difference or the level ratio between a light emission zero point detection signal from said light receiving element which has received the light from said light emitting element and the test detection signal from said light receiving element resulting from the reception of the light when said test light emitting element is emitted and comparing the level difference or the level ratio with a predetermined level; and a determination unit for determining the abnormality of said light emitting element, said test light emitting element and said light receiving element and the pollution and the like of said light receiving element from the result of comparison effected by said calculation and comparison unit.

3. A photoelectric smoke detector according to claim 1 or claim 2, further comprising a readable/writable data rewriting memory for setting a determination level to be compared with the level difference or the level ratio.

4. A photoelectric smoke detector according to claim 1, wherein the zero point detection signal output from said light receiving element is added with the drive pulse for control output from said light emission controller to thereby adjust the zero point detection signal to a prescribed level.

5. A photoelectric smoke detector according to claim 2, wherein the zero point detection signal output from said light receiving element is added with the drive pulse for control output from said light emission controller to thereby adjust the zero point detection signal to a prescribed level.

6. A photoelectric smoke detector according to claim 3, wherein the zero point detection signal output from said light receiving element is added with the drive pulse for control output from said light emission controller to thereby adjust the zero point detection signal to a prescribed level.

7. A disaster monitoring system having a plurality of the photoelectric smoke detectors according to claim 1 disposed therein and connected to a control panel for controlling the plurality of said photoelectric smoke detectors, wherein a transmission/reception circuit is disposed to said photoelectric smoke detectors to transmit and receive data to and from said control panel, said photoelectric smoke detectors being tested based on a test A/D conversion command transmitted from said control panel through said transmission/reception circuit and the result of a determination made in the test by the determination unit being transmitted to said control panel through said transmission/reception circuit together with address data for identifying each of said photoelectric smoke detectors.

8. A disaster monitoring system having a plurality of the photoelectric smoke detectors according to claim 2 disposed therein and connected to a control panel for controlling the plurality of said photoelectric smoke detectors, wherein a transmission/reception circuit is disposed to said photoelectric smoke detectors to transmit and receive data to and from said control panel, said photoelectric smoke detectors being tested based on a test A/D conversion command transmitted from said control panel through said transmission/reception circuit and the result of a determination made in the test by the determination unit being transmitted to said control panel through said transmission/reception circuit together with address data for identifying each of said photoelectric smoke detectors.

9. A disaster monitoring system having a plurality of the photoelectric smoke detectors according to claim 3 disposed therein and connected to a control panel for controlling the plurality of said photoelectric smoke detectors, wherein a transmission/reception circuit is disposed to said photoelectric smoke detectors to transmit and receive data to and from said control panel, said photoelectric smoke detectors being tested based on a test A/D conversion command transmitted from said control panel through said transmission/reception circuit and the result of a determination made in the test by the determination unit being transmitted to said control panel through said transmission/reception circuit together with address data for identifying each of said photoelectric smoke detectors.

10. A disaster monitoring system having a plurality of the photoelectric smoke detectors according to claim 4 disposed therein and connected to a control panel for controlling the plurality of said photoelectric smoke detectors, wherein a transmission/reception circuit is disposed to said photoelectric smoke detectors to transmit and receive data to and from said control panel, said photoelectric smoke detectors being tested based on a test A/D conversion command transmitted from said control panel through said transmission/reception circuit and the result of a determination made in the test by the determination unit being transmitted to said control panel through said transmission/reception circuit together with address data for identifying each of said photoelectric smoke detectors.

* * * * *